(12) United States Patent
Chandrasekaran et al.

(10) Patent No.: US 11,934,288 B2
(45) Date of Patent: Mar. 19, 2024

(54) SYSTEM AND METHOD FOR ASSESSING PERFORMANCE OF SOFTWARE RELEASE

(71) Applicant: Cognizant Technology Solutions India Pvt. Ltd., Chennai (IN)

(72) Inventors: Rajkumar Chandrasekaran, Chennai (IN); Karthikeyan Vedagiri, Chennai (IN); Vishwajit Mankar, Pune (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 342 days.

(21) Appl. No.: 17/157,101

(22) Filed: Jan. 25, 2021

(65) Prior Publication Data

US 2022/0156173 A1     May 19, 2022

(30) Foreign Application Priority Data

Nov. 17, 2020  (IN) .............................. 202041049931

(51) Int. Cl.
*G06F 11/34*  (2006.01)
*G06F 11/36*  (2006.01)
(Continued)

(52) U.S. Cl.
CPC ...... *G06F 11/3409* (2013.01); *G06F 11/3452* (2013.01); *G06F 11/3476* (2013.01); *G06F 11/3604* (2013.01); *G06F 11/3676* (2013.01); *G06Q 10/00* (2013.01); *G06Q 10/06* (2013.01); *G06Q 30/02* (2013.01)

(58) Field of Classification Search
None
See application file for complete search history.

(56) References Cited

U.S. PATENT DOCUMENTS 8,290,806 B2    10/2012   Lee
8,819,617 B1 *   8/2014   Koenig .................... G06F 8/70
                                                            717/102
(Continued)

FOREIGN PATENT DOCUMENTS

CA          3048466 A1 *   1/2020   ............ G06F 11/323

OTHER PUBLICATIONS

Rana Majumdar, "Assessing software upgradation attributes and optimal release planning using DEMATEL and MAUT", Int. J. Industrial and Systems Engineering, vol. 31, No. 1, 2019.
(Continued)

*Primary Examiner* — Susanna M. Diaz
(74) *Attorney, Agent, or Firm* — CANTOR COLBURN LLP (57) ABSTRACT

The present invention relates to a system and method for assessing performance of a software release in a production environment. The attempt is to measure impact of delivered features and correlate with cost incurred in building those features to calculate a return on investment made. The disclosure, thus, provides for fetching relevant details from plurality of tools or data sources, correlating the fetched information and linking it with milestone data. This milestone data is labeled with a milestone id to enable querying of data sources and determine impact delivered. The determined impact is linked with calculated cost identifier to finally assess the release performance.

8 Claims, 3 Drawing Sheets

(51) Int. Cl.
  *G06Q 10/00*  (2023.01)
  *G06Q 10/06*  (2023.01)
  *G06Q 30/02*  (2023.01)

(56) References Cited

U.S. PATENT DOCUMENTS

| | | | |
|---|---|---|---|
| 2006/0123389 A1* | 6/2006 | Kolawa | G06F 11/3616 |
| | | | 717/124 |
| 2012/0331439 A1 | 12/2012 | Zimmermann | |
| 2015/0278731 A1* | 10/2015 | Schwaber | G06Q 10/0639 |
| | | | 717/102 |
| 2017/0083571 A1* | 3/2017 | Shankar | G06F 16/282 |
| 2017/0235569 A1 | 8/2017 | Sturtevant | |
| 2018/0165178 A1* | 6/2018 | Rosomoff | G06Q 10/0635 |
| 2018/0217829 A1* | 8/2018 | Mowatt | G06F 8/71 |
| 2019/0026106 A1* | 1/2019 | Burton | G06F 40/30 |
| 2019/0340287 A1* | 11/2019 | Tamjidi | G06F 16/242 |
| 2020/0012493 A1* | 1/2020 | Sagy | G06F 11/3428 |
| 2020/0081814 A1* | 3/2020 | Srinivasan | G06F 8/71 |
| 2021/0073235 A1* | 3/2021 | Li | G06F 16/2471 |
| 2021/0248143 A1* | 8/2021 | Khillar | G06F 16/2379 |
| 2021/0342480 A1* | 11/2021 | Kogan | G06F 16/156 |
| 2022/0051162 A1* | 2/2022 | Fox | G06Q 10/06315 |

OTHER PUBLICATIONS

Laura-Diana Radua, "Effort Prediction in Agile Software Development with Bayesian Networks", Department of Accounting, Business Information Systems and Statistics, Faculty of Economics and Business, URL: https://orcid.org/0000-0002-1463-8369, Oct. 19, 2018.

* cited by examiner

SYSTEM AND METHOD FOR ASSESSING PERFORMANCE OF SOFTWARE RELEASE

CROSS REFERENCE TO RELATED APPLICATION

This application is related to and claims the benefit of Indian Patent Application Number 202041049931 filed on Nov. 17, 2020, the contents of which are herein incorporated by reference in their entirety.

FIELD OF INVENTION

The subject matter described herein, in general, relates to system and method for assessing performance of a software release, and, in particular, relates to a system and method for assessing performance based on cost invested and impact delivered by release of software product.

BACKGROUND OF INVENTION

Today, fast changing world demands accelerated software delivery so that the end products reach the customers quickly. Most often, software delivery is viewed from three different perspectives i.e. engineering, operations and business. While the engineering perspective focuses on building features that the business needs, the operations focuses on availability and stability of those features, as the business focuses on delivering value to the customers using such meaningful features.

In general, enterprises employ cutting edge tools, technologies and resources, both human and machine, in order to achieve the desired outcomes in terms of business impact or revenue growth. The resources may be anything from time spent on creating new product or features to that invested on addition or creation of new hardware setup for supporting new features or products that are being developed to meet functionality that satisfies the given specification. However, once the features are deployed on product, it becomes extremely challenging to measure the scale of business impact delivered.

For example, let's consider a scenario where a production/product release has say X number of business objectives. As on date, this release objective measurement is abstract as it includes one or more of the following measurements: clicks generated for a particular website, no of checkouts completed using new feature or reduction of errors in the production setup, support tickets generated or volume of transactions supported during the peak season. But, there is no objective way by which such business impact or return on investment (ROI) could be measured—by definition ROI may be defined as the ratio between the total cost of release which has been put together in order to deliver the necessary impact along with the measurement of actual impact.

In addition, it is very difficult to find the ROI, especially to know which release made maximum impact on business and in turn find out features to focus upon in future. This can also be against the defined benchmark. It is with respect to these and other general considerations that aspects disclosed herein have been made. In addition, although relatively specific problems may be discussed, it should be understood that the aspects should not be limited to solving the specific problems identified in the background or elsewhere in this disclosure. Accordingly, the limitations of contemporary solutions emphasize upon a need for a system and method capable of assessing performance based on cost invested in building a feature and impact delivered by release of the feature to production environment.

OBJECTS OF THE INVENTION

The primary object of the present disclosure is to provide a system and method capable of assessing performance of software release based on cost incurred and impact delivered in a production environment.

Another object of this disclosure is to provide a dynamic system and method capable of computing ratio between cost expended in software build process and impact delivered upon release of software product.

These and other objects will become apparent from the ensuing description of the present invention.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Briefly described, in a preferred embodiment, the present disclosure overcomes the above-mentioned disadvantages, and meets the recognized need by providing a method and for assessing performance of a software release. The method, for instance, comprises of fetching and correlating application development data with performance data of the software release present in one or more data sources. This is followed by linking the correlated application development and performance data with a milestone data labeled with a milestone id, for each release cycle. Next step involves querying of the one or more data sources to determine impact identifier of the software release based on the labeled milestone data, which is correlated with the cost identifier of the software release. Finally, ratio between the correlated impact and cost ratio identifier is computed for assessing performance of the software release.

In one aspect of the disclosure, the impact identifier is a measurement of technical impact, key performance indicators or a combination thereof.

In another aspect of the disclosure, milestone data is dynamically updated and specified with a start date and end date of the software application release, while the milestone id is selected from release id, release information, data source name, milestone unique identifier, or a combination thereof.

In another aspect of the disclosure, system for assessing performance of a software release is proposed. The system comprises of microprocessor communicatively coupled to a memory, and further comprises one or more data sources configured to host application development and performance data of the software release. Next, data fetching module is configured to fetch and correlate the host application development and performance data of the software release from the one or more data sources. A milestone creator then links the correlated application development and performance data with a milestone data labeled with a milestone id for each release cycle. Then, a query factory queries the one or more data sources to determine impact identifier of the software release based on the labeled milestone data. The engine then correlates the determined impact identifier with cost identifier of the software release, when finally, ratio calculator computes ratio between the correlated impact and cost identifier. The dashboard viewer then renders the computed ratio for assessing the performance of software release.

These and other aspects, features and advantages of the present invention will be described or become apparent from the following detailed description of preferred embodiments.

DETAILED DESCRIPTION OF THE EMBODIMENTS

It has to be understood and acknowledged for this specification and claims and for purposes of illustration, the invention is described in the context of moderating interaction between customer and service provider, but it will be understood that the system and method of the present invention can be applied in a variety of contexts and domains.

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

The present invention is described below with reference to methods and systems in accordance with general embodiments of present disclosure. The instructions may be loaded into the system, which when executed upon such a computer-implemented system—a general-purpose computer or a special purpose hardware-based computer systems, creates means for training the system and implementing functions of various modules hosted by the system. Accordingly, the present invention may take the form of an entirely hardware embodiment, an entirely software embodiment, or an embodiment combining software and hardware aspects.

Figure 1:
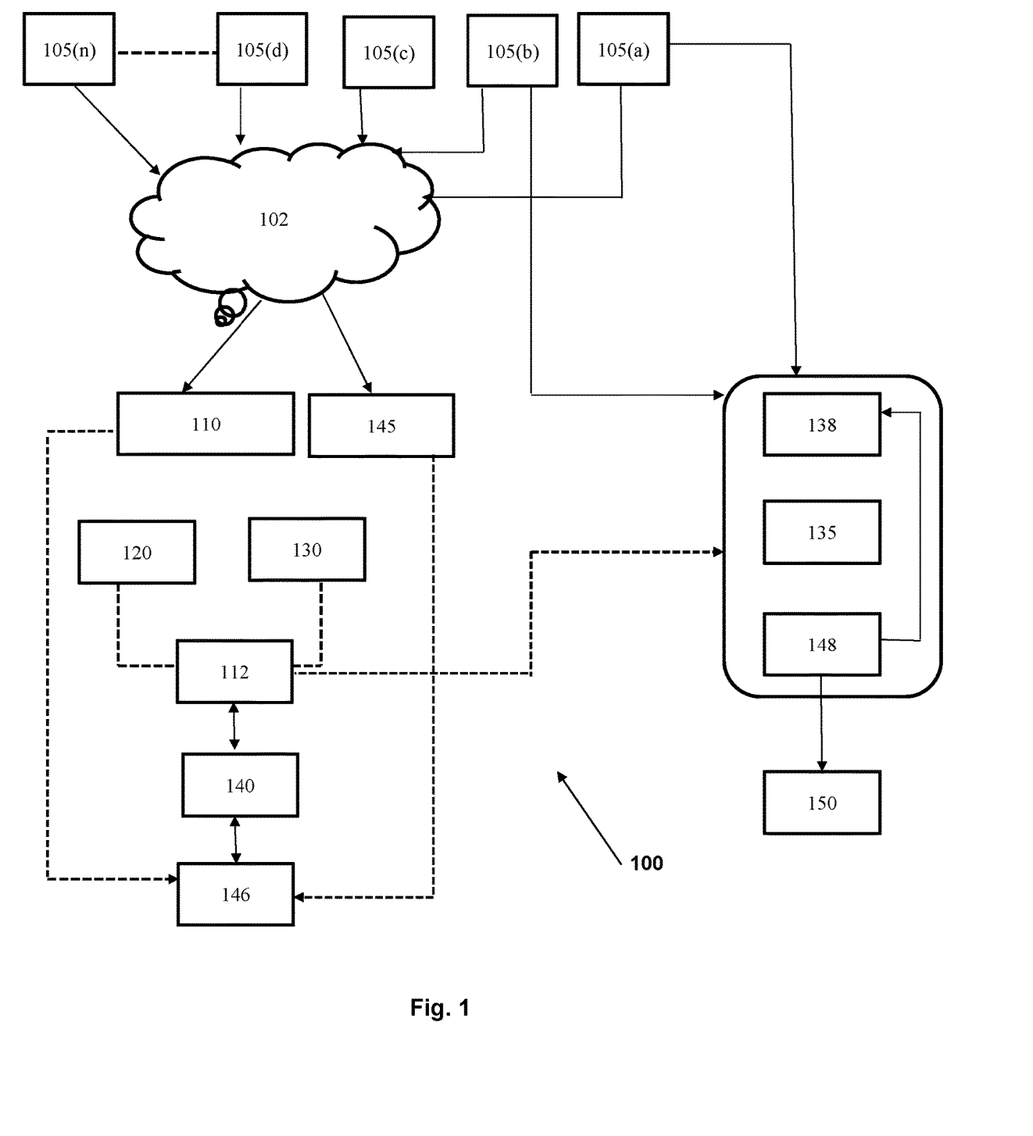
FIG. 1 is a representation of system architecture, as shown in accordance with a preferred embodiment of the present disclosure.

Referring now to FIG. 1, the system 100, in its basic configuration is a computer-based system for assessing performance of a software release in a production or delivery environment. Precisely, the system 100 is configured to determine cost incurred and impact delivered by software product in a release environment. In some embodiments, the system 100 and its modules or various components are executed or embodied by one or more physical or virtual computing systems. For example, in some embodiments, a server computing system that has components including a central processing unit (CPU), input/output (I/O) components, storage, and memory may be used to execute some or all of the components of the system 100. The I/O components include a display, a network connection 102, a computer-readable media drive, and other I/O devices (e.g., a keyboard, a mouse, speakers, etc.). An embodiment of the system 100 can be stored as one or more executable program modules in the memory of the server, and the system 100 can interact with computing nodes (e.g., physical computing systems and/or virtual machine instances) over the network 102. The network 102 may include the internet or any other network capable of facilitating communication amongst the system module and external devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network, an Ethernet connection and the like. In one embodiment, the system 100 may have additional components or fewer components than described above.

FIG. 1 shows the system 100 hosting its plurality of modules executable by a processing unit in certain implementations. In one embodiment, the system 100 provisions an application data fetching module 110, a cost computation module 120, an impact assessment module 130, a milestone creator 135, a query factory 138, and an engine 140 that works collaboratively to measure performance of packages constituting software release in a delivery environment. The system 100 additionally includes a dashboard viewer 150 that renders the performance results before the business for decision making.

In accordance with one particular embodiment, one or more data sources 105(a), 105(b), 105(c), . . . 105(n), collectively referred to by numeral 105, and including an application monitoring module 105(a), a log management module 105(b) are provided that host application development and performance data of the software release. These data sources 105 generally refer to the applications from which relevant data needs to be collected and performance results of the software release are to be calculated. The applications can be based out of any technology stack. Precisely, there is no pre-requisite for the application. In one exemplary embodiment, these data sources 105 may comprise Software delivery pipeline, Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools.

While Representational state transfer refers to the mechanism of collecting data by pull mechanism, the present disclosure further supports the push mechanism for data collection in one alternate embodiment. In this model, the system 100 which contains the necessary data on an event of a change will send the necessary information associated with the event to an identified endpoint. Once the event change reaches the endpoint, the data is processed by the system 100 and then persisted in the graph storage 112.

To begin with, the cost computation module 120 is configured to interface with one or more tools involved in development of software to gather data and corresponding metadata pertaining to time and cost associated with software release. The gathered data is converted into one or more object formats and correlating the converted data by storing in a graph database 112 as one or nodes and corresponding relationships and properties. In an embodiment of the present invention, data from the one or more tools is gathered using Representational State Transfer (REST) Application Program Interface (API). In another embodiment, the one or more object formats comprise Java Script Object Notation (JSON) format.

In an embodiment of the present invention, the data stored in the graph database 112 is used to calculate the additional cost incurred in release by identifying areas of the software development that require attention, ensure proper procedures and standards are followed, estimate technical debt, monitor the various phases of development, determine engineering metrics for the portfolio/application, determine the parts that are broken, estimate effort and time required for build and deployment, estimate velocity of the application and estimate value of each release. The cost computation module 120 is capable of estimating cost of software release by applying pre-stored costing algorithms. In an embodiment of the present invention, the additional cost incurred during the release of the software is estimated by first defining various vectors and tools required during software development.

Next, in accordance with one preferred and particular embodiment of present disclosure, the impact assessment module 130 is configured to estimate impact factor delivered by release of software feature in production environment. Primarily, the impact assessment module 130 computes two kinds of impact: a) Technical impact b) Business impact. In one aspect, the technical impact is measured via an application monitoring module 105(a) and log management module 105(b). These modules may be of wide variety in nature. The application monitoring usually refers to the measurement of resources consumed from an infrastructure standpoint. The tools could range from a simple open source solution like Prometheus to a commercial solution like the New Relic. Some of the technical parameters which are usually measured are: heap memory consumption, CPU utilization, application usage and traffic, response time for a particular URL or method call, no of identified exceptions for a given URL or feature call, no of instances of a particular object created, method or procedure calls, transaction time, query response time, no of external service call, throughput or SLA.

In another preferred embodiment, the impact assessment module 130 measures the business impact or key performance indicators for a given application. These may vary according to the type of the application and the measurement used. Say for instance, for a web-based application, the measurement may be done using web analytics tools but not limited Google web analytics or the open source version of matomo. On the contrary, for a system, which is not based on web—sometimes the business KPI are even measured by the log management module 105(b). For example, the measurement of a certain type of tags in the logging system can give insights to a business KPI. For instance, in accordance with one exemplary embodiment, the log management module 105(b) may be any of any tools, though not limited to, elastic search, splunk and so on.

Some exemplary sample business KPIs for an IT system comprise: no. of logins to a particular portal, no. of checkouts happening at a given time, no. of dropouts during a multi-page registration process, no. of views for a particular page, no. of subscription renewals for a given period of time, improved service quality through reduced outages or reduced technical debts, improved operational efficiency through better productivity, better resource utilization, lower cost, improved customer value by means of better experience through faster response to customer need or improved customer satisfaction, improved business performance by access to new market, increased market share or improved profitability.

In next noteworthy embodiment, the technical impact is measured employing an application monitoring module 105(a) and a log management module 105(b). Accordingly, the application monitoring module 105(a) is configured to provide a querying mechanism for querying data fetched from the data sources 105. In one exemplary embodiment, this may refer to any standard commercial or open source application monitoring solutions. For example, it may be a simple spring boot application which is instrumented by Prometheus or a commercial off the shelf solution like New Relic. Precisely, the Prometheus data can be queried using necessary PromQL language. Similarly, commercial applications can be queried using REST API or custom scripts to return necessary data for consumption.

In same vein, log management module 105(b) or common sink is provided for all the applications for which technical and business impact is to be measured. This may be an open source ELK (elastic stack) solution or the commercial solution like splunk or something which is offered by the native cloud providers. This also represents the solution like Google web analytics which tracks the web traffic, which will be one another entity that facilitates impact measurement.

Now, in accordance with preferred embodiment of present disclosure, the milestone creator 135 is provided that is configured to act as a bridge between the heterogeneous data sources 105 from which the cost and impact needs to be calculated. Here, the data collected from various data sources 105 are correlated to address particulars related to:
  impact on the infrastructure due to the release made
  cost involved in order to create the feature
  business impact delivered for the release which was made
  time taken to deliver this business impact
  ratio between cost and impact delivered for every feature
  resources delivering maximum impact from a feature standpoint
  forecasting of cost or feature impact based on past history
  forecasting of infra needs based on projected impact delivery
  importance of technical features to save on infra costs
  reduction in Meantime to detection (MTTD)
  improvements in Mean time to recovery (MTTR)

As stated in above paragraphs, data which is needed to calculate the cost of delivery will be present in the graph database storage 112 with necessary correlations. Accordingly, for milestone creator 135 to perform its functionality, one of the entities is identified for linkage to the data sources 105, which contains the data for calculating the impact. In one example embodiment, the entity identification may be user defined and the user can provide the input for the linkage. Now, this milestone data is baselined with each release using a unique identifier such as a release id or deployment id along with release/deployment date of the application.

Next, the data items quintessential for creation of a milestone comprises of:
  1) Name—defined arbitrarily by a user to identify a milestone, e.g. Milestone 1
  2) Start date—from which this milestone is effective (this will be chosen from a date picker)
  3) End date—until which this milestone is effective. If this is left blank, then the end date is taken as current 4) Data source (Optional)—needed when different data sources are to be queried from the query factory (as will be discussed in later sections). If all the information is present inside graph database 112, then this field remains empty.

5) Unique entity—that acts as linkage between data collected between different data sources 105. This one is a mandatory field since it helps in creating relationships between data from different sources 105.

All data collected by the application monitoring module 105(*b*) after a release date is to be tagged with unique milestone id, which can be a release or deployment id for traceability. In essence, the milestone creator 135 links the application development and performance data with a milestone data labeled with a milestone id, for each release cycle. By this logic, it becomes convenient for business to measure impact of latest release and compare it with previous releases. Date related information is critical in this logic as unique milestone release id may vary from an organization to organization and even within an organization. For example, the linkage between the pipeline data and data provided by application monitoring module 105(*a*) may be the build ID or the deployment ID. In the same way, the linkage between the pipeline data and the data from log management module 105(*b*) may be deployment information or the release information.

Figure 2:
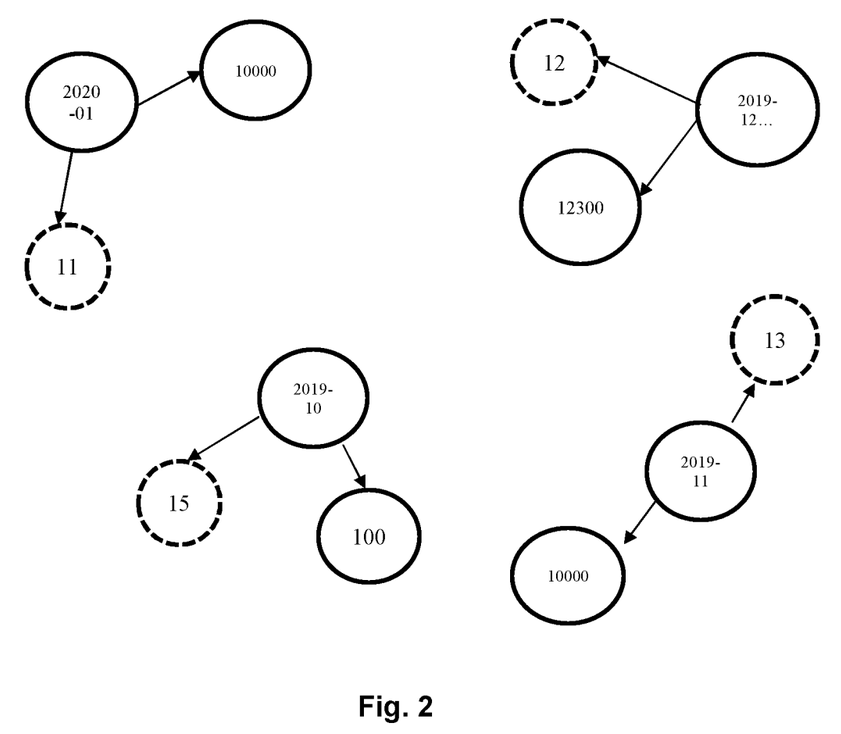
FIG. 2 depicts milestone data linked to technical impact measuring nodes, in accordance with one preferred embodiment of present disclosure.

Following from above, unique milestone id that may be provided for linkage may be any of: data source name, connection information for necessary data source, and milestone unique identifier. This milestone id may be stored inside graph database 112 as a separate sub graph to enable multiple relationships across different data sources based on the impact, which needs to be calculated. FIG. 2 illustrates how the deployment is linked to the technical impact measurement nodes inside the graph database storage 112. As shown, the middle node is the deployment which links to the various technical impact which is created, the dashed nodes represent the technical impact (CPU utilization, heap memory, no. of threads), while the others are representative of business impact (response time and no. of page hits). Table 1 below depicts the association between technical and business impact inside a graph database (Neo4j).

In one significant embodiment, the producer 145 is provisioned with two configuration files that act as a reference for the producer 145 and assists in fetching the desired information. One configuration file comprises of information in terms of data source connection and credentials for fetching the necessary information which needs to be send to messaging queue 146 (discussed next in detail), while the second configuration file filters the necessary information in order to fetch the KPI. It keeps track of the date unto which it has already fetched the data such that in subsequent fetches, it can start from the place where it had last left. The necessary information also contains information in terms of the schedule in which this information has to be fetched. The producer 145 first reads the configuration file to know the endpoint for release from which it has to initiate communication. Then, it makes a REST API call using the endpoint information.

Once the information from the REST API is fetched, it parses through the various fields which are present in the response. The fields which match the ones to what is needed are collected together. These fields with the necessary identifiers are combined into what is known as message packets, which are published into the corresponding messaging queue 146 whose connection details are present in the first configuration file. Once this is done, the second tracking file is updated, so that in the subsequent runs of data collection, the starting point will be the place from where the data run is completed in the previous run.

Following from above, in one exemplary embodiment, the producer 145 is provided with a base framework, which then pushes the information to a messaging queue or broker 146 at pre-configured intervals. The API invocation and publication of data is abstracted by a mechanism common for all the producers. In one preferred embodiment, one producer is provided for each data source 105 from which the impact measurement information has to be collected. For example, if there are five systems which contain the impact related information, then it is preferable to have five producers, each talking to a separate data source and each having its own configuration and response filtering mechanism.

Next working embodiment discusses specifics of messaging queue or broker 146, which generally uses any open

TABLE 1

| "Application" | "ReleaseDate" | "ResponseTime" | "PageHits" | "CPU" | "Heap" | "Threads" |
|---|---|---|---|---|---|---|
| "registration" | "2019 Nov. 12" | "12 ms" | "10000" | "13" | "180" | "9" |
| "checkout" | "2019 Dec. 12" | "13 ms" | "12300" | "12" | "160" | "7" |
| "Shipping" | "2020 Jan. 12" | "14 ms" | "10000" | "11" | "150" | "8" |

Now, the query factory 138 queries the data sources 105, various tools, application monitoring module 105(*a*) and log management module 105(*b*) for impact determination based on above 'labeled milestone data. Next working embodiment presents scenario, where the data source is unsupported by a query language for querying. Here, the system, in addition to above components, comprises of a producer 145, which is configured to fetch the impact measurement information and relevant information in terms of KPI from the necessary data sources 105. For purposes of clarity, producer has been referred to by numeral 145, while it performs a function that of a data fetching module 110. Thus, producer (145) can alternately be referred to as data fetching module 110 for general understanding and sense. In one exemplary embodiment, the producer 145 involves a custom application built on either of Python or Java Spring Boot.

source available off the shelf messaging systems for this purpose. In one example RabbitMQ or Kafka or similar platforms can be utilized. The choice whether to use RabbitMQ or Kafka depends on the need for real time availability of data along with the fault tolerance capability. The data which would be placed in the messaging queue 146 is not limiting, and it follows the standard publish & subscribe model, wherein the messaging queue 146 is configured to facilitate interaction between the one or more producers 145 and a data aggregator.

In first scenario, one or more producers 145 serve as the publishers and the data aggregator acts as a consumer and consumes the data placed on the message queue. The one or more producers use the REST API and pre-configured credentials to call the one or more tools or data sources 105. This information from the data sources 105 along with corresponding metadata is then placed on the messaging queue 146 in a proper messaging format to be picked by an engine 140 for further processing.

In a second scenario, the producers 145, at pre-configured intervals, place the relevant information concerning the system status in the messaging queue 146 with the necessary metadata, and the engine 140 which has subscribed to this message will consume the message and then pass the information back to the centralized console which helps in reporting the status to the administrator.

In next working embodiment, the engine 140 collects the information from the messaging queue 146, and assembles them in the necessary object format to further pass it to the data access layer, which is then passed on to the graph database 112. In one example embodiment, the engine 140 may be a custom-built java spring application, which helps in consuming messages in the configured order to push them into the graph storage 112. Further, the engine 140 ensures to create the necessary co-relations between the cost and the impact related data to enable the other components to generate the performance reports. Thus, the engine 140 correlates this technical impact and business impact related information, as measured from conventionally existing tools with the software delivery pipeline data in order to measure the return on investment (ROI), derivable from the cost invested by business in delivering the impact.

The graph database 112, mentioned above, is a data store repository which stores the data collected from the various tools using the REST API interfaces. The data along with its relationships and their metadata are stored in a graph format which enables easy traversal and search of the data when in need. For exemplary purposes, the choice of graph database is any of the open source or commercially available solution, not limited to Neoj4, Cosmos, TigerGraph and so on.

In another following embodiment of present disclosure, the query factory 138 is the delegator which is configured to query the various data sources 105. It is expected to make use of the proxy or the factory pattern which takes in the information from the calling application in terms of data source which needs to be queried, and query type to be executed along with the response that needs to be communicated back. Typically, it is configured to interact with any number of data sources 105 and, in general, is a multi-threaded application, which can execute multiple queries in parallel.

In yet another working embodiment of present disclosure, the system 100 further comprises of report builder 148 that provides an interface between the end user and data sources 105, and acts as the single source of interaction. Based on the type of measurement, the reporting templates are configured. Each entry in the template may be supplemented with detailed information in terms of the KPI definition, data source that has the information and the necessary query or script which needs to be executed at the corresponding data source. The report builder 148, in turn, use the information available with milestone creator 135 to co-relate the information that is present across different data sources 105 to show the impact generated by the features. Also, the builder 148 is expected to have standard features like the capability to display the content, graphs and provide an option to export them as a PDF (portable document format) or mail them to selected individuals.

The report builder 148 may have different report templates, where each template may further have a collection of KPI (Key Performance Indicators). The report builder application 148 then aggregates the KPI, call the query factory 138 to fetch the information from the graph storage 112 or other data sources, and then combine the information with the HTML template to generate a document type, say for example a PDF, which contains the computed ratio.

Figure 3:
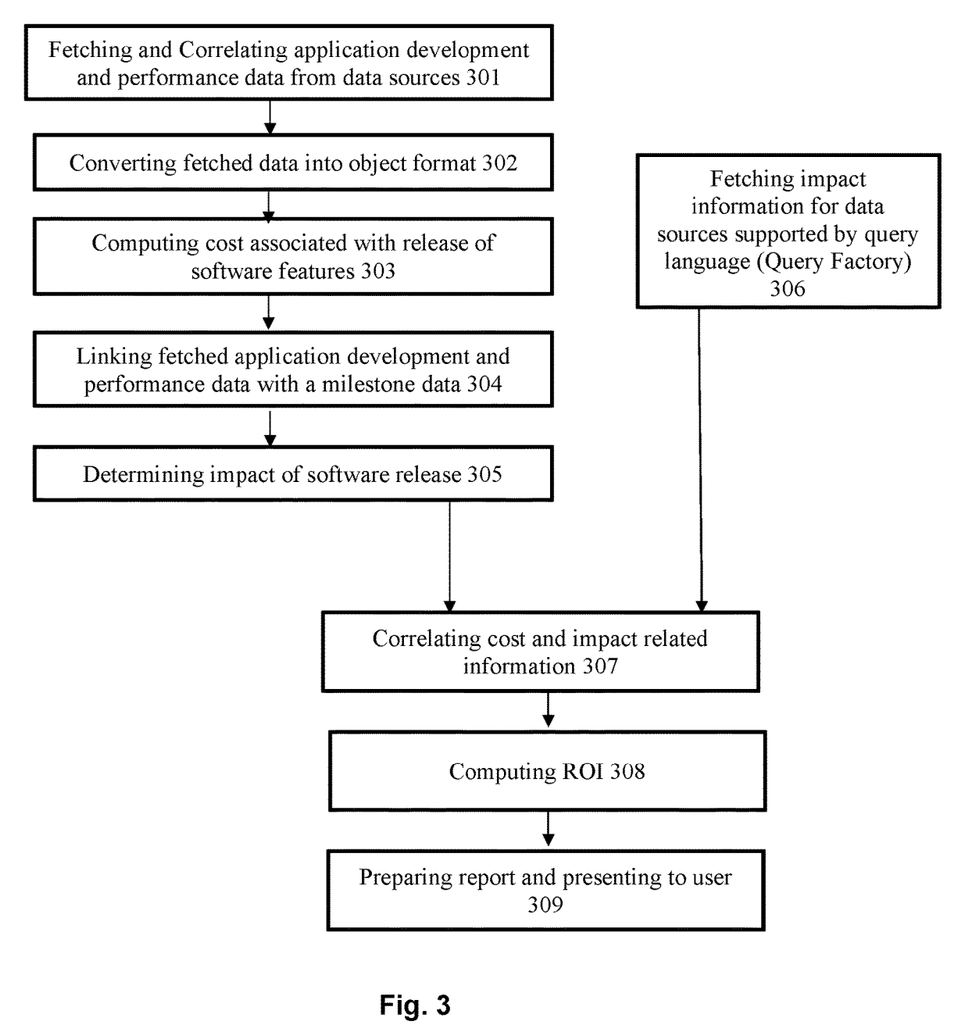
FIG. 3 is a workflow of method for assessment of software release performance, in accordance with one preferred embodiment of present disclosure.

Now, FIG. 3 sequentially depicts method steps involved in assessing performance of a software release. In step 301, application development and performance data of the software release along with corresponding metadata, which is hosted on one or more data sources 105, or alternatively referred to as tools, is fetched and correlated. The one or more tools are employed by one or more enterprises for developing software products. Further, each tool has specific functionalities and interacts with other tools during software development. In an embodiment of the present invention, the one or more tools include, but not limited to, Source Control Management (SCM) tools, Continuous Integration (CI) tools, code review tools, static code analysis tools, release planning tools, artifact repositories, package repositories, Information Technology Service Management (ITSM) tools, deployment automation tools, infrastructure provisioning tools, database versioning tools, configuration automation tools and release monitoring tools. In an embodiment of the present invention, the data is collected from the one or more tools or data sources 105 using Representational State Transfer (REST) Application Program Interface (API)

In step 302, the collected data is converted to one or more object formats. In an embodiment of the present invention, the collected data is converted into a JavaScript Object Notation (JSON) format. Further, the converted data in the JSON format is then used for creating and storing one or more nodes and its properties in a graph database 112. This step includes a scenario where a data source of the one or more data sources is unsupported by a query language for querying. Here, the producer fetches the impact information and relevant information in terms of KPI from the necessary data sources 105. This is followed by tracking timing feed of the fetching step to determine endpoint for current fetching event. Importantly, this tracking of time feed is needed so that the subsequent fetching event is initiated from the endpoint of previous one.

Now, the fetched information is pushed into a messaging queue at pre-configured intervals. This messaging queue may use any open source available off the shelf messaging systems for this purpose. In one example RabbitMQ or Kafka or similar platforms can be utilized. The data which would be placed in the messaging queue 146 is not limiting, and it follows the standard publish & subscribe model, wherein the messaging queue 146 is configured to facilitate interaction between the one or more agents and a data aggregator, as discussed above. In step 303, cost associated with release of software product based on identification of technical debts, engineering metrics for software application, broken aspects of the software release, time and effort invested in build and deployment of the software application, estimating velocity of the application and value of each release.

In step 304, the fetched application development and performance data is linked with a milestone data labeled with a milestone id, for each release cycle. In one specific embodiment, this milestone data is dynamically updated and specified with a start date and end date of the software application release. It serves as a bridge between the heterogeneous data sources 105 from which the cost and impact needs to be calculated. Accordingly, one of the entities is identified for linkage to the data sources 105, which contains the data for calculating the impact. In one example embodiment, the entity identification may be user defined and the user can provide the input for the linkage. Now, this milestone data is baselined with each release using a unique identifier such as a release id or deployment id along with release/deployment date of the application.

In one specific embodiment, data items quintessential for creation of a milestone comprises of:

1) Name—defined arbitrarily by a user to identify a milestone, e.g. Milestone 1
2) Start date—from which this milestone is effective (this will be chosen from a date picker)
3) End date—until which this milestone is effective. If this is left blank, then the end date is taken as current
4) Data source (Optional)—needed when different data sources are to be queried from the query factory (as will be discussed in later sections). If all the information is present inside graph database 112, then this field remains empty.
5) Unique entity—that acts as linkage between data collected between different data sources 105. This one is a mandatory field since it helps in creating relationships between data from different sources 105.

Following from above, unique milestone id that may be provided for linkage may be any of: data source name, connection information for necessary data source, and milestone unique identifier. This milestone id may be stored inside graph database as a separate sub graph to enable multiple relationships across different data sources based on the impact, which needs to be calculated.

In step 305, the impact of software release is identified based on computation of two kinds of impact: a) Technical impact b) Business impact. In one aspect, the technical impact is measured using application monitoring module 105(a) and log management module 105(b). Further, business impact or key performance indicators are measured for a given application. In one working embodiment, the data sources 105 are queried based on labeled milestone data.

The information collected from various tools (in case querying of data sources is permissible) or messaging queue (where data sources cannot be directly queried), is assembled in necessary object format and stored in graph database. In step 306, the query factory 138 queries the data sources, various tools, application monitoring module 105(a) and log management module 105(b) for impact determination based on 'labeled milestone data'. In step 307, the technical impact and business impact related information is correlated with cost related information and software delivery pipeline data. Next, the ratio between the correlated impact and cost ratio identifier is computed for assessing the performance of the software release in step 308. Finally, in step 309, the report builder generates a report in a proper format and rendered on a dashboard viewer for decision making. In one example embodiment, the report is rendered on the one or more pre-configured dashboards based on pre-defined roles of the one or more users. In an embodiment of the present invention, the one or more electronic devices used by the one or more users include, but not limited to, laptops, desktops and handheld devices such as tablets and mobile phones.

The foregoing description is a specific embodiment of the present disclosure. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

We claim:

1. A system for assessing performance of a software release, the system comprising:
a microprocessor communicatively coupled to a memory configured to:
fetch and correlate application development and performance data of the software release hosted in one or more data sources;
link the correlated application development and performance data with a milestone data labeled with a milestone id, for each release cycle, wherein the milestone id is stored as a separate sub graph to enable multiple relationships across the data sources based on technical impact in terms of central processing unit utilization, and wherein the milestone data is dynamically updated and specified with a start date and end date of a software application release;
query the one or more data sources to determine impact identifier of the software application release based on the labeled milestone data, wherein in an event a data source of the one or more data sources is unsupported by a query language for querying thereof, determining the impact identifier by:
fetching a first configuration file, comprising connection and credential information of the one or more data sources to be queried, and a second configuration file that filters information to fetch a key performance indicator and keeps track of date unto which the application development and performance data is fetched from the one or more data sources, wherein a Representational State Transfer Application Programming Interface (REST API) call is made to the one or more data sources using the first configuration file and the second configuration file;
parsing and combining fields of a response of the REST API call into message packets and publishing the message packet into a messaging queue using connection details present in the first configuration file;
tracking timing feed of the fetching step using the second configuration file to determine an endpoint for current fetching event and updating the second configuration file such that subsequent fetching event is initiated from the endpoint of previous one; and
filtering the impact identifiers for assessing the performance of the software application release and to determine technical impact delivered by a software product in a release environment.

2. The system as claimed in claim 1, wherein the one or more data sources comprises software delivery pipeline, change management tools, application performance, monitoring and log analytics systems.

3. The system as claimed in claim 1, wherein the microprocessor is configured to determine a cost identifier based on identification of technical debts, engineering metrics for software application, broken aspects of the software release, time and effort invested in build and deployment of the software application, estimating velocity of the application and value of each release.

4. The system as claimed in claim 1, wherein the impact identifier is a measurement of technical impact, key performance indicators or a combination thereof.

5. The system as claimed in claim 4, wherein the technical impact of the software application release is captured using application performance systems, log monitoring systems or a combination thereof.

6. The system as claimed in claim 1, wherein the messaging queue hosts the fetched application development and performance data that is assembled and converted to one or more object formats for facilitating uninterrupted processing of high information inflow from the one or more data sources.

7. The system as claimed in claim 1, wherein the system comprises a graph database configured to correlate the fetched application development and performance data and corresponding relationships and properties in the form of one or more nodes, wherein each of the one or more nodes comprise converted information corresponding to a specific data source.

8. The system as claimed in claim 1, wherein the milestone id comprises a release id, release information, data source name, milestone unique identifier, or a combination thereof.

* * * * *